United States Patent [19]

Perkins

[11] 4,047,008
[45] Sept. 6, 1977

[54] PSEUDO-RANDOM NUMBER SEQUENCE GENERATOR

[75] Inventor: Frank A. Perkins, Melbourne, Fla.
[73] Assignee: Harris Corporation, Cleveland, Ohio
[21] Appl. No.: 660,115
[22] Filed: Feb. 23, 1976
[51] Int. Cl.² .............................................. G06F 7/00
[52] U.S. Cl. ...................................... 235/152; 331/78
[58] Field of Search ......................... 235/152; 331/78

[56] References Cited
U.S. PATENT DOCUMENTS

| | | | |
|---|---|---|---|
| 3,609,327 | 9/1971 | Paine ..................................... | 235/152 |
| 3,761,696 | 9/1973 | Russell ................................. | 235/152 |
| 3,811,038 | 5/1974 | Reddaway ........................... | 235/152 |
| 3,838,259 | 9/1974 | Kortenhaus ......................... | 235/152 |

*Primary Examiner*—David H. Malzahn

[57] ABSTRACT

In a pseudo-random number sequence generator, a random access memory is provided having a plurality of storage locations, each storage location having a number or bit pattern stored therein. A first number is accessed and read by a function generator. A second number is accessed, and an operation such as modulo two addition is performed on the first and second numbers, with a result being provided. Further numbers can be accessed and logically combined with one another, or with the previous result. The operations can all be identical, or may be mixed, so that, for example, some exclusive OR and some AND functions are performed. The result comprises an output digit and can also be written into the second storage location to replace the second number, or intermediate results can be loaded into this location. In successive cycles, the storage location having the most recently produced result comprises the first location, and a next storage location comprises the second storage location for that cycle. The system may be clocked by a pulse stream having a desired output information bit rate coupled to an instruction generator to enable a preselected sequence of operations in the function generator and to generate relative addresses for relative locations in the random access memory. A counter and adder may increment the relative addresses to provide the absolute addresses of the storage locations to be accessed during a given cycle.

7 Claims, 4 Drawing Figures

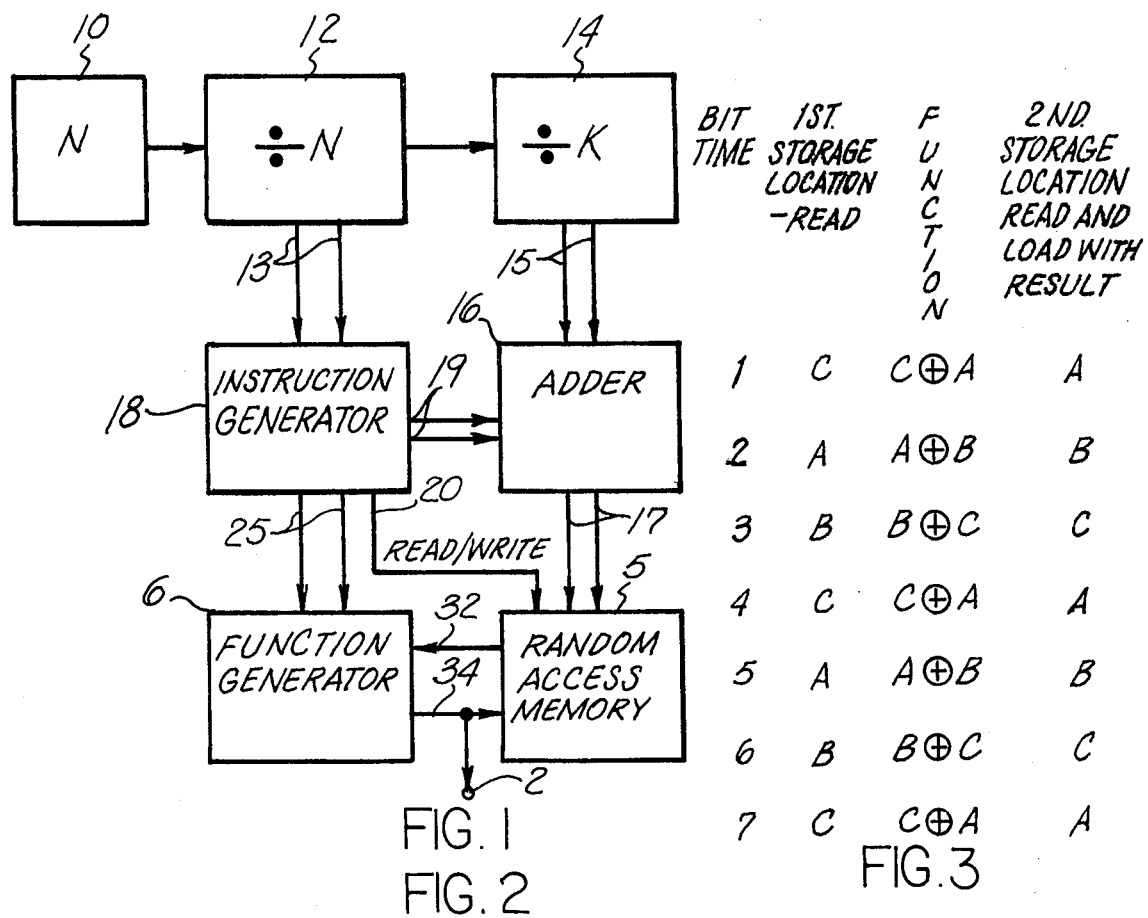
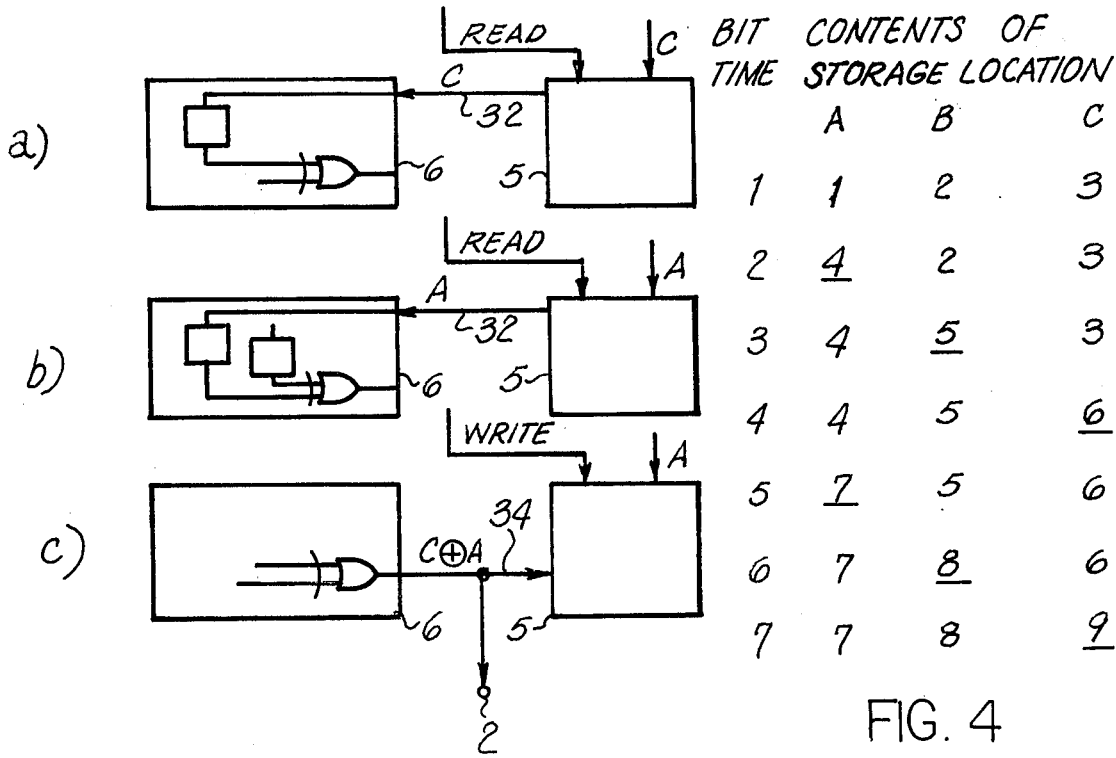

PSEUDO-RANDOM NUMBER SEQUENCE GENERATOR

BACKGROUND OF THE INVENTION

This invention relates to the generation of random digital signals, and particularly to a pseudo-random number generator which may be used for encoding in communication systems.

Pseudo-random sequences are useful in a wide variety of applications such as security encoding and decoding, error correction, encoding, radar, and system testing and have been used in electronic bingo number generators. Pseudo-random number generators are well-known in data enciphering means in which a transmitted data pulse stream is modified in accordance with a random sequence of digits. The modified pulse stream may only be deciphered by a decoder embodying knowledge of that random number sequence. In order to provide for increased security, it is desirable that the random number sequence be made long so as to impede the capability of deciphering by an undesired party.

A common component of typical pseudo-random number generators is a shift register. In typical digital enciphering schemes, a shift register is used having taps at least first and second stages thereof, the first and second stages not necessarily being adjacent. The taps are connected to modulo two adders and/or AND gates providing outputs for many different known forms of processing. During successive time periods, which may be called bit times, clock times, or cycles, digits are shifted from each stage to the next. Thus digits from prior stages are shifted into the stages with taps to provide outputs to provide numbers to be operated upon.

The number of different logical functions which may be obtained by use of modulo two addition or ANDing is related to the number of taps on a shift register. Generally, the number of instructions which can be performed by such an enciphering circuit within one bit time is related to the number of taps utilized in the shift register. For most prior embodiments, in order to provide complex interaction between stages, many inter-pin connections on a shift register must be made. Further, if it is desired to alter the functions performed by a shift register, a large number of tap lines must be physically rewired or otherwise logically gated in order to modify the sequence.

The number of pins on a shift register increases linearly with the length thereof, i.e., with the number of stages in the shift register. The physical length of a shift register is limited as a practical matter. Parallel output shift registers are not feasible beyond a few tens of bits per package since the cost thereof and difficulty of connections becomes prohibitive. The limitation on the length of the shift register limits the length of the pseudo-random sequence which can be generated in a one shift register circuit. Longer more complex sequences can be generated only with additional complexity and expense in logic circuitry.

SUMMARY OF THE INVENTION

It is therefore an object of the present invention to provide a pseudo-random number sequence generator utilizing a random access memory in place of a shift register for storage of digits, whereby the number of accessible storage locations can be doubled while requiring only a single additional external connection pin for addressing.

It is also an object of the present invention to provide a random number sequence generator of the type described in which an instruction generator controls access to the random access memory to operate upon numbers from first and second locations therein and return a result to one storage location of the random access memory or in which the instruction generator controls access to the random access memory to operate upon numbers from various locations therein and return a result to one or more locations.

It is another object of the present invention to provide a random number sequence generator of the type described wherein the arithmetic operations performed thereby may be altered without requiring a change in wiring of the number storage means, whereby a large variety of different sequences may be selected only by change of an instruction sequence.

It is more specific object of the present invention to provide a random number sequence generator of the type described wherein the number of input/output connections in digit storage means is low compared to a random number sequence generator utilizing a shift register having the same number of storage locations.

It is another object of the present invention to provide a random number sequence generator having the capability of performing different arithmetic operations during successive bit times.

It is a further object of the present invention to provide a method for producing a pseudo-random number sequence.

Briefly stated, in accordance with the present invention there is provided a random access memory having a plurality of storage locations each storing a number. Means are provided for accessing a predetermined sequence of storage locations during successive cycles, for example two locations during each cycle, and providing the outputs thereof to a function generator which operates upon the numbers to produce a result. The result, which may comprise an output digit, is located into one of the storage locations. The operation is repeated during successive cycles with the storage locations accessed being shifted by a counter.

BRIEF DESCRIPTION OF THE DRAWINGS

The means by which the foregoing objects and features of invention are achieved are pointed out in the claims forming the concluding portion of the specification. The invention, both as to its organization and manner of operation, may be further understood by reference to the following description taken in connection with the following drawings.

Of the Drawings:

FIG. 1 is a block diagrammatic representation of a random number generator constructed in accordance with the present invention;

FIG. 2 is a timing diagram illustrating the operation within bit times of a cycle; and FIGS. 3 and 4 are charts useful in understanding the operation of the present invention.

DESCRIPTION OF THE PREFERRED EMBODIMENT

Referring now to FIG. 1, there is illustrated a pseudo-random number sequence generator constructed in accordance with the present invention. The system is clocked by a pulse train from a source 10. The source frequency may be indicative of the data rate of a communication data signal to be enciphered or may simply be a clock frequency. The output random number sequence is provided at an output terminal 2. The output terminal 2 may be connected to well-known enciphering means for encoding data such as a train of data pulses.

At the heart of the present circuit is a random access memory 5. The random access memory 5 comprises addressable storage means having a plurality of storage locations, which for purposes of understanding the operation of the present invention may be analogized to the successive stages of a shift register. In a typical shift register encoder, taps on a last and on other stages provide numbers to operating means and receive a result for loading a first stage. However, in the present invention, numbers from at least first and second locations are accessed for operation thereon by a function generator 6. In the preferred embodiment, the function generator 6 provides the result as the output number digit at the terminal 2 and writes the result into a storage location in the random access memory 5. During a next cycle, or bit time, the operations are repeated, but numbers are accessed from different storage locations, one of which holds the most recently produced result. The numbers accessed therefrom are operated upon by the function generator 6, and the process of providing a random digit at the output terminal 2 and writing into the new storage location is repeated. While in the present exemplification, the numbers stored in the random access memory 5 and output at the terminal 2 are binary digits, appropriate hardware could be provided to accomodate other forms of numbers.

In the circuit of FIG. 1, a pulse source 10 supplies a pulse train having a pulse rate of N times a desired pulse rate R. The pulse source 10 is connected to a divide by N counter 12. The divide by N counter 12 provides an output at the desired rate R to a divide by K counter 14. The divide by K counter 14 provides multistage outputs 15 to an adder 16 which is connected to address the random access memory 5. The divide by N counter 12 has a plurality of stages, and the stages are connected by lines 13 to an instruction generator 18 comprises a read only memory, and the outputs of the stages of the divide by N counter 12 comprise addresses thereto. The instruction generator 18 is preset to provide appropriate outputs as described below. An output 19 of the instruction generator 18 is connected to provide inputs to the adder 16, and a read-write control line 20 is connected between the instruction generator 18 and the random access memory 5. More than one output line 19 is shown in FIG. 1 to illustrate that a multibit output may be provided. Instructions are connected from the read only memory instruction generator 18 to the function generator 6 by control lines 25. A data line 32 is connected between the random access memory 5 and the function generatore 6, whereby the function generator 6 may read outputs from the random access memory 5. A data line 34 is connected from the function generator 6 to the random access memory 5 for writing into an addressed location. In the present embodiment, the output terminal 2 is connected to the data line 34.

For simplicity of illustration, a three-location random access memory 5 is illustrated. It will be appreciated, however, that the invention will operate similarly and display its maximum advantages when a random access memory 5 having thousands of locations is utilized. For purposes of the present description, the three locations are labeled A, B and C. In FIG. 2, comprising FIGS. 2a, 2b and 2c which are each partial illustrations of the circuit of FIG. 1, the functions performed in the present embodiment during one bit time, or one cycle are illustrated.

In the present embodiment, the instruction generator 18 establishes parts or subcycles, i, ii and iii of each bit time. In order to provide this operation, the instruction generator 18 is preferably a read only memory and is addressed by the divide by N counter 12. The divide by N counter 12 has a plurality of stages, such as shift register stages and each count in the divide by N register 12 thus comprises an address. The number N may be selected to provide a sufficient number of addresses to enable as many different instructions to be accessed from the read only memory instruction generator 18 as desired. In the present embodiment, only three portions or subcycles are required in each bit time for the operations performed. Therefore, the number N may be four and the divide by N counter 12 need only have two stages. Three different addresses are available, and the divide by N counter 12 may be reset every time a sequence of three addresses has been provided.

The read only memory 18 is prewired or preloaded such that during the first count within one bit time a first address enables the function generator to receive data from the random access memory 5. The instruction generator 18 need only have as many storage locations as there are operations to be performed during one bit time and need only put out as many bits per storage location as needed for control of the adder 16, control line 20, and function generator 6. At the output 19, relative addresses are provided. In other words, during each cycle the storage locations accessed within the random access memory 5 will be displaced from each other in location in a fixed relationship. Thus, during one bit time, the instruction generator 18 need only repeat the same set of relative addresses at the output 19.

Sets of absolute addresses per bit time are provided by the adder 16 in the following manner. The divide by K counter 14 provides a multistage output which is a continuing count during successive cycles. The count increases during successive bit times. Thus the relative addresses are provided at the output 19 of the instruction generator 18 and are incremented by the divide by K counter 14 so that the output of the adder 16 comprises the proper location for the proper bit time.

The function generator 16 provides the function of modulo two addition. Other arithmetic and/or logic functions could be provided by utilization of other readily ascertainable forms of the function generator 16.

Referring to FIG. 2a, during part i of a bit time, address C, which is the address of location C at the random access memory 5 is provided) to the random access memory 5 from the adder 16. The instruction generator 18 energizes the control line 20 with a read signal, and the control lines 25 from the instruction generator 18 instructs the function generator 6 to store the number accessed from storage location C. This occurs during bit time one, as illustrated in FIG. 3, which is a chart illustrating successive cycles of operation of the subject circuit. During part ii of bit time one, a second storage location, during this cycle the storage location A, is addressed by the adder 16 from the random access memory 5, and the control line 20 is energized with a read signal so that the number from storage location A (represented by A in FIG. 2b) is delivered to the function generator 6. The control lines 25 permits the function generator 6 to perform the desired function which in the present embodiment is modulo two addition. This function is functionally illustrated in the form of storing the numbers accessed from the locations from the locations C and A in buffers connected to an exclusive OR gate. An exclusive OR gate provides an output of a first binary polarity when the inputs thereto are of the same binary value and provides the opposite binary value when the inputs thereto are different binary values. Thus the truth table for an exclusive OR gate may be identical to that for modulo two addition. Thus in the present embodiment, a separate subcycle of bit time is not required for operation on the two input numbers. However, in other embodiments, a separate subcycle may be provided. During part iii of bit time one the adder 6 addresses location A of the random access memory 5. The instruction generator 18 energizes the control line 20 to enable writing into the random access memory 5, and the control lines 25 permit the result C plus A modulo two to be written into the random access memory 5 in location A. At the same time, an output signal C plus A modulo two is provided at the output terminal 2. As seen in FIG. 3, during bit time two, storage location A becomes the first storage location, and storage location B is the second storage location.

FIG. 4 is a chart of the digits stored in locations A, B and C during successive cycles. It should be noted that in FIG. 4 the numbers illustrated are not the values of the numbers in the location but rather are the numbers identifying the numbers in each storage location. In FIG. 4, the number underlined is the number provided as the output at the output terminal 2 from the previous cycle. Since in the present embodiment, the random access memory 5 has three locations, the non-repeating length of the sequence generated is $2^K - 1$, or 7 digits.

Thus the present embodiment illustrates a simplified means for providing a linear sequence. However, nonlinear sequences can be generated by providing the function generator 6 with additional functions, for example, the logical AND. It should be noted that the instruction generator 18 in the present embodiment initiates the same operations during each bit time. However, the instruction generator 18 is capable of generating a large variety of sequences by changes in the instruction sequence. The change in the instruction sequence can be made either by changing the read only memory embodying the instruction generator 18 or by utilizing a programmable read only memory (PROM) 18. This is a particularly convenient form of logic for integrated circuit manufacture since the number of input and output connections is relatively small. Consequently, a more reliable and lower cost integrated circuit "chip" may be produced embodying the present invention. The addition of external data input either to the random access memory 5 or to the function generator 6 allows the unit to combine data with the sequence in any desired form for encoding and decoding.

The capacity of the present random number sequence generator is improved with respect to shift register random number sequence generators since random access memories 5 of several thousand bits are available in a single package, whereas parallel output shift registers are not feasible beyond a few tens of bits per package. Programmability of complex sequences is also much easier with the subject sequential device, since only the instructed addresses and instruction set of the instruction generator 18 need be changed. However, performing the same change in a shift register embodiment would require switching the connections or gating of a large number of tap lines connected to stages in a shift register device. If one or more stages of the divide by K counter 14 of FIG. 1 are used to address the instruction generator 18 in addition to the divide by N counter 12, a more complex sequence may be generated. This capability is not easily provided in a shift register device.

What is thus provided is a pseudo-random number sequence generator in which during a cycle a first number is accessed and a second number is accessed with an operation being performed upon the first and second numbers, and wherein the result is written into the second location and an output number is provided. The specification has been written with a view toward enabling those skilled in the art to make many modifications and the departures from the specific circuitry shown to provide a random number sequence in accordance with the present invention.

What is claimed is new and desired to be secured by Letters Patent of the United States is:

1. A pseudo-random number sequence generator comprising: a random access memory having a plurality of addressable storage locations, each for storing a number; a logic function generator means for operating upon at least a first and second number to provide a result; addressing means for accessing a first number from a first storage location of said random access memory and for accessing a second number from a second storage location having a predetermined location with respect to said first storage location; means providing said first and second numbers to said logic function generator means such that a result is provided, and means for providing the result as an output random number and for writing the result in said second storage location, whereby said second number is replaced by said result and whereby a cycle is complete; and control means for controlling said addressing means and said logic function generator means and said memory means for performing successive said cycles such that during each cycle the storage location having a result of a previous cycle comprises the first storage location.

2. A pseudo-random number sequence generator according to claim 1 wherein the numbers comprise one bit binary numbers.

3. A pseudo-random number sequence generator according to claim 1 wherein said logic function generator means comprises means for performing modulo two addition and wherein the result equals the modulo two sum of the first number and the second number.

4. A pseudo-random number sequence generator according to claim 1 wherein said control means periodically provides control signals in predetermined timed relationship to enable read and write functions of said random access memory means and for enabling operations of said logic function generator means according to a preselected sequence.

5. A pseudo-random number sequence generator according to claim 4 further comprising a clock source having a rate NR, where R is the desired output bit rate, a divide by N counter having parallel output stages and an input connected to said clock source, and wherein said control means comprises a read only memory.

6. A pseudo-random number sequence generator according to claim 6 wherein said control means further comprises means for providing an output indicative of relative addresses indicative of relative locations of said first and second storage locations in said random access memory means.

7. In a pseudo-random number sequence generator, means for producing a random number comprising addressable storage means having a plurality of locations, means for accessing at least a first number and a second number from said storage means having predetermined relative locations, logic means for operating upon said at least first and second numbers to provide a result and producing an output random number in response to said result and returning a number indicative of said result into a storage location, whereby a cycle is performed, and control means for controlling said storage means and said logic means and said accessing means for performing additional cycles such that during each cycle to storage location having the most recent result comprises the first storage location.

* * * * *